United States Patent
Zhang et al.

(10) Patent No.: US 12,166,980 B2
(45) Date of Patent: Dec. 10, 2024

(54) SYSTEMS AND METHODS FOR BLOCK DIVISION IN VIDEO PROCESSING

(71) Applicant: ZHEJIANG DAHUA TECHNOLOGY CO., LTD., Zhejiang (CN)

(72) Inventors: Xue Zhang, Hangzhou (CN); Dong Jiang, Hangzhou (CN); Jucai Lin, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 77 days.

(21) Appl. No.: 18/170,518

(22) Filed: Feb. 16, 2023

(65) Prior Publication Data

US 2023/0209052 A1 Jun. 29, 2023

Related U.S. Application Data

(63) Continuation of application No. PCT/CN2022/081024, filed on Mar. 15, 2022.

(30) Foreign Application Priority Data

Jun. 24, 2021 (CN) .......................... 202110706737.5

(51) Int. Cl.
*H04N 19/96* (2014.01)
*H04N 19/103* (2014.01)
(Continued)

(52) U.S. Cl.
CPC ......... *H04N 19/119* (2014.11); *H04N 19/103* (2014.11); *H04N 19/156* (2014.11);
(Continued)

(58) Field of Classification Search
CPC .. H04N 19/119; H04N 19/103; H04N 19/156; H04N 19/159; H04N 19/172; H04N 19/176; H04N 19/147; H04N 19/169
See application file for complete search history.

(56) References Cited

U.S. PATENT DOCUMENTS

| | | | |
|---|---|---|---|
| 2019/0387226 A1 | 12/2019 | Lee | |
| 2020/0137424 A1* | 4/2020 | Zhao | .................... H04N 19/119 |

(Continued)

FOREIGN PATENT DOCUMENTS

| | | |
|---|---|---|
| CN | 110913232 A | 3/2020 |
| CN | 111327894 A | 8/2020 |

(Continued)

OTHER PUBLICATIONS

First Office Action in Chinese Application No. 202110706737.5 mailed on Mar. 2, 2022, 19 pages.
(Continued)

*Primary Examiner* — Howard D Brown, Jr.
(74) *Attorney, Agent, or Firm* — METIS IP LLC

(57) ABSTRACT

The present disclosure relates to systems and methods for block division and encoding in video processing. A method may include obtaining a block to be predicted in an image frame. The method may also include determining, based on a plurality of division modes of the block, a target division mode of the block. The plurality of division modes may include an equal division mode that is configured to divide the block into multiple sub-blocks with a same size. The method may further include dividing, based on the target division mode, the block into a plurality of sub-blocks, and encoding the block based on the plurality of sub-blocks.

19 Claims, 15 Drawing Sheets

(51) Int. Cl.
*H04N 19/119* (2014.01)
*H04N 19/156* (2014.01)
*H04N 19/159* (2014.01)
*H04N 19/172* (2014.01)
*H04N 19/176* (2014.01)

(52) U.S. Cl.
CPC ......... *H04N 19/159* (2014.11); *H04N 19/172* (2014.11); *H04N 19/176* (2014.11)

(56) References Cited

U.S. PATENT DOCUMENTS

| | | |
|---|---|---|
| 2021/0368172 A1 | 11/2021 | Lim et al. |
| 2022/0360777 A1* | 11/2022 | Choi ............... H04N 19/176 |
| 2022/0417511 A1* | 12/2022 | Li .................... H04N 19/105 |

FOREIGN PATENT DOCUMENTS

| | | | |
|---|---|---|---|
| CN | 111770340 A | 10/2020 | |
| CN | 111988612 A | 11/2020 | |
| EP | 3637782 A1 | 4/2020 | |
| WO | 2017123980 A1 | 7/2017 | |
| WO | WO-2021032171 A1 * | 2/2021 | ........... H04N 19/105 |
| WO | 2022267569 A1 | 12/2022 | |

OTHER PUBLICATIONS

International Search Report in PCT/CN2022/081024 mailed on Apr. 28, 2022. 5 pages.
Written Opinion in PCT/CN2022/081024 mailed on Apr. 28, 2022, 5 pages.
Telecommunication Standardization Sector of ITU, ITU-T H.265, 2015, 635 pages.
F. Le Léannec et al., Asymmetric Coding Units in QTBT, JVET Meeting, 2016, 10 pages.
Bordes P. et al., Description of SDR, HDR and 360° Video Coding Technology Proposal by Qualcomm and Technicolor—Medium Complexity Version, JVET Meeting, 2018, 57 pages.
Vadim Seregine et al., Exploration Experiment on Enhanced Compression Beyond VVC Capability (EE2) ,JVET Meeting, 2021, 7 pages.
The Extended European Search Report in European Application No. 22827074.0 mailed on Aug. 2, 2023, 11 pages.

* cited by examiner

Mode 11

Mode 12

Mode 13

Mode 14

Mode 15

Mode 16

Mode 17

Mode 18

Mode 19

Mode 20

Mode 21

Mode 22

Mode 23

Mode 24

Mode 25

Mode 26

Mode 30

Mode 31

Mode 32

Mode 33

SYSTEMS AND METHODS FOR BLOCK DIVISION IN VIDEO PROCESSING

CROSS-REFERENCE TO RELATED APPLICATIONS

This application is a Continuation of International Application No. PCT/CN2022/081024 filed on Mar. 15, 2022, which claims priority to Chinese Patent Application No. 202110706737.5, filed on Jun. 24, 2021, the contents of each of which are incorporated herein by reference in their entirety.

TECHNICAL FIELD

The present disclosure relates to video coding technology, and in particular, to systems and methods for block division in video coding.

BACKGROUND

In the existing video coding technology, block division manners are not rich enough, which may affect the fitting performance of the block division to image texture, thereby affecting the efficiency of the video coding. In addition, the existing block division manners are regular, that is, boundaries of sub-blocks obtained by the block division are straight lines, which may reduce the flexibility of the block division and implicitly increase the division depth of the block division.

Therefore, it is desirable to provide systems and methods for block division, which may improve the fitting performance of the block division to the image texture, thereby improving the efficiency of the video coding.

SUMMARY

According to an aspect of the present disclosure, a method for block division and encoding in video processing is provided. The method may include obtaining a block to be predicted in an image frame. The method may also include determining, based on a plurality of division modes of the block, a target division mode of the block. The plurality of division modes may include an equal division mode that is configured to divide the block into multiple sub-blocks with a same size. The method may further include dividing, based on the target division mode, the block into a plurality of sub-blocks, and encoding the block based on the plurality of sub-blocks.

In some embodiments, the plurality of division modes may further include at least one derivative division mode based on the equal division mode. The at least one derivative division mode may be obtained by removing a count of division boundaries from the equal division mode. The count may be greater than or equal to 1 and less than a difference between a count of the multiple of sub-blocks and 1.

In some embodiments, the plurality of division modes may include a combination division mode. The combination division mode may include a first division mode and a second division mode, and be configured to divide the block into multiple sub-blocks based on the first division mode and further divide at least one of the multiple sub-blocks based on the second division mode.

In some embodiments, a dividing direction of the first division mode may be vertical to a dividing direction of the second division mode.

In some embodiments, the plurality of division modes may further include a step division mode with a stepped division boundary.

In some embodiments, the step division mode may be determined based on a beginning position of the division of the block or a division direction of the division of the block.

In some embodiments, whether the step division mode is used and an index of a division proportion of the step division mode may be included in a codec end.

In some embodiments, the determining, based on the plurality of division modes of the block, the target division mode of the block may include comparing costs of the plurality of division modes; and designating, from the plurality of division modes, a division mode with a smallest cost as the target division mode.

In some embodiments, the method may further include determining a division condition based on at least one of a size of the block or a type of the image frame, and the dividing, based on the target division mode, the block into the plurality of sub-blocks include determining whether the target division mode is suitable for the block based on the division condition; and in response to a determination that the target division model is suitable for the block, dividing the block, based on the target division mode, into the plurality of sub-blocks.

In some embodiments, the method may further include encoding the block based on an index of the target division mode.

According to an aspect of the present disclosure, a system for block division and encoding in video processing is provided. The system may include at least one storage device storing executable instructions, and at least one processor in communication with the at least one storage device. When executing the executable instructions, the at least one processor may cause the system to perform a method including obtaining a block to be predicted in an image frame. The method may also include determining, based on a plurality of division modes of the block, a target division mode of the block. The plurality of division modes may include an equal division mode that is configured to divide the block into multiple sub-blocks with a same size. The method may further include dividing, based on the target division mode, the block into a plurality of sub-blocks, and encoding the block based on the plurality of sub-blocks.

According to an aspect of the present disclosure, a non-transitory computer readable medium is provided. The non-transitory computer readable medium may include a set of instructions. When executing the executable instructions, at least one processor may cause a system to perform a method including obtaining a block to be predicted in an image frame. The method may also include determining, based on a plurality of division modes of the block, a target division mode of the block. The plurality of division modes may include an equal division mode that is configured to divide the block into multiple sub-blocks with a same size. The method may further include dividing, based on the target division mode, the block into a plurality of sub-blocks, and encoding the block based on the plurality of sub-blocks.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It should be understood that the term "encoding unit," "current block," "encoding block," or "block," used herein refer to a basic unit of image processing or a specific position in an image and are used interchangeably. In addition, in the description of the present disclosure, the term "unit" includes all concepts of encoding unit, prediction unit, and transformation unit.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 1:
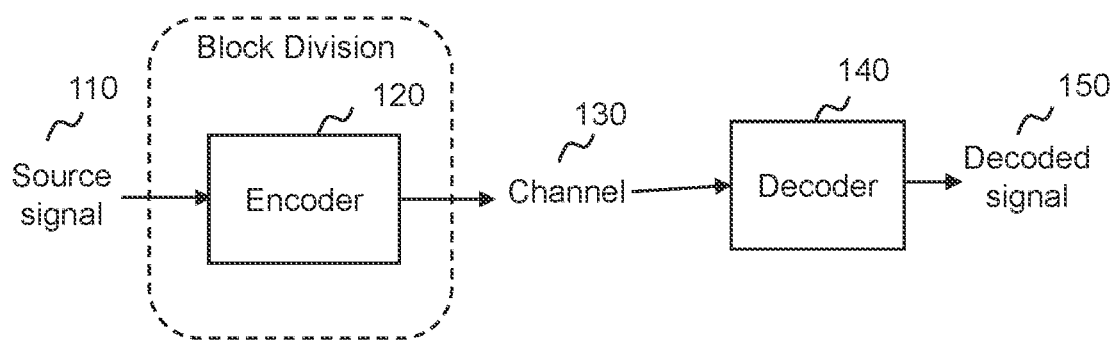
FIG. 1 is a schematic diagram illustrating an exemplary video processing system according to some embodiments of the present disclosure.

FIG. 1 is a schematic diagram illustrating an exemplary video processing system according to some embodiments of the present disclosure.

In some embodiments, a video processing system 100 may be applied to a video compression system, such as an air television broadcasting system, a cable television transmission system, a satellite television transmission system, an Internet video transmission system, a digital video stored in media, or the like. As used herein, video compression refers to a process of reducing the amount of data required to present a video. The purpose of the video compression may be to reduce redundant information in the video data so as to store and transmit the video data effectively.

As shown in FIG. 1, the video processing system 100 may include a source signal 110, an encoder 120, a channel 130, a decoder 140, and a decoded signal 150.

In some embodiments, the source signal 110 may refer to a video signal (also referred to as a video source or a video source signal). In some embodiments, the video source signal may refer to uncompressed dynamic images, for example, dynamic images in a digital video format.

In some embodiments, the encoder 120 may refer to a signal compression standard completed by software and/or hardware applications. The encoder 120 may be configured to compress the video source signal at a sending end to obtain an encoded video source signal (i.e., an encoded source signal).

In the video encoding process, an image frame may be input. When an image frame is encoded, the image frame may be divided into several largest coding units (LCUs), and then each of the several LCUs may be divided into multiple coding units (CUs). The video coding may be performed on the CUs.

In some embodiments, the decoder 140 may refer to a signal compression standard completed by software or hardware applications. The decoder 140 may be configured to generate an approximation of the video source signal in a decoding end for playback.

In some embodiments, the encoder 120 may perform transformation and quantization operations on residual information of the video source signal generated by intra prediction technique. The residual information may be encoded through entropy coding and transmitted to the decoding end. The decoder 140 may extract the residual information from information transmitted from the encoder 120, and further determine a reconstructed value of the video source signal by combining a predicted value obtained by motion estimation.

In some embodiments, the channel 130 may transmit or store encoded video data (e.g., the compressed/encoded video source signal). The channel 130 may include a wireless channel, a wired channel, or a frequency band. The channel 130 may include a twisted pair, a cable, an optical fiber, or a medium that may propagate electromagnetic waves.

In some embodiments, the decoded signal 150 may refer to data (i.e., video data after being compressed and decompressed) reconstructed from the source signal 110 after being encoded and decoded.

In some embodiments, the encoded video data (e.g., the compressed/encoded video source signal) may be stored in a storage device (e.g., a hard disk), and the encoded video data may be read from the storage device during a subsequent decoding processing process.

In some embodiments, the video processing system 100 may further include a channel encoder. The channel encoder may refer to a device or program that may further encode the encoded video source signal before channel transmission at the sending end. The channel encoder may be configured to perform an error correction. In some embodiments, the video processing system 100 may further include a channel decoder. The channel decoder may be configured at a receiving end to detect and correct an error in data transmission. The encoded video source signal may be unzipped by the channel decoder.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
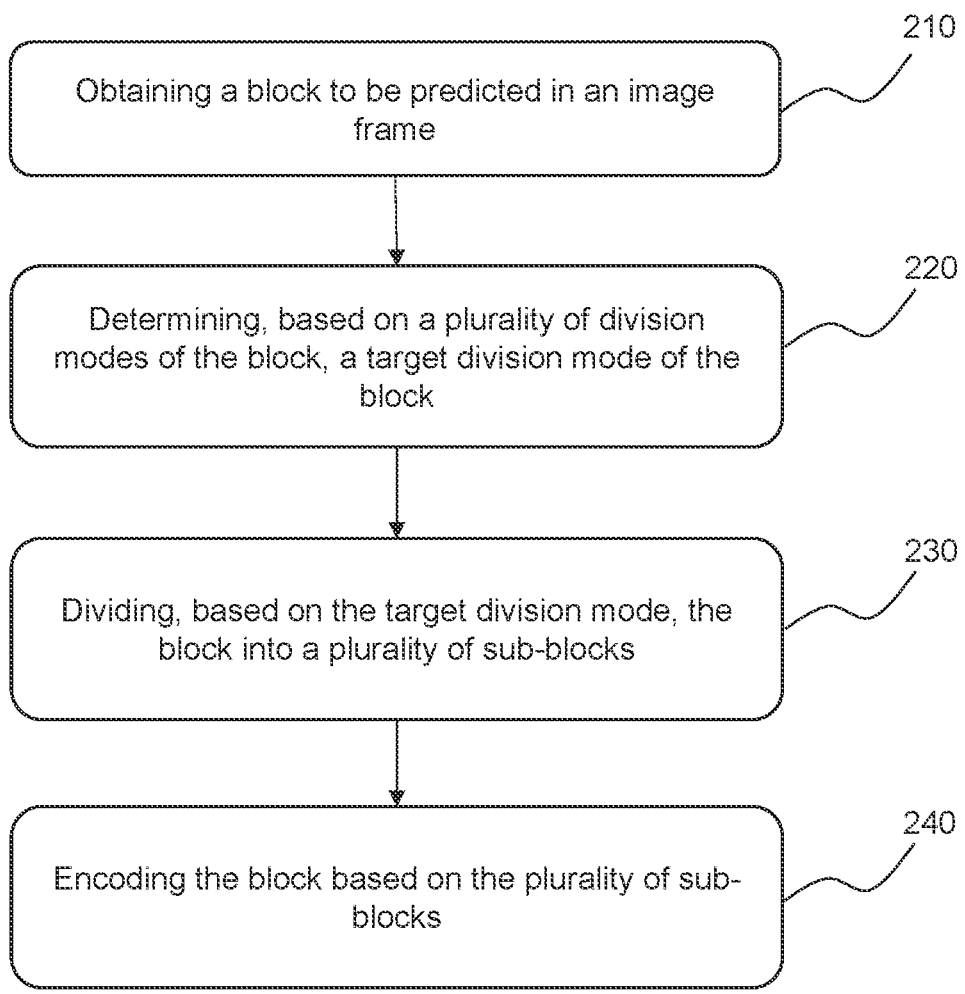
FIG. 2 is a flowchart illustrating an exemplary process for block division according to some embodiments of the present disclosure.

FIG. 2 is a flowchart illustrating an exemplary process for block division according to some embodiments of the present disclosure. In some embodiments, the process 200 may be implemented by a video processing system (e.g., the video processing system 100 illustrated in FIG. 1, a video processing system 900 illustrated in FIG. 9). In some embodiments, the video processing system may be implemented by software and/or hardware, and/or may be integrated into a video processing device (e.g., a video processing device 1000 illustrated in FIG. 10) that includes a processing device (e.g., a processing device 1010). In some embodiments, at least part of process 200 may be performed by the processing device including at least one processor and a storage device (e.g., a storage 1020). For example, the process 200 may be stored in the storage device in the form of instructions (e.g., an application), and invoked and/or executed by the processing device. The operations of the illustrated process presented below are intended to be illustrative. In some embodiments, the process 200 may be accomplished with one or more additional operations not described, and/or without one or more of the operations discussed. Additionally, the order in which the operations of the process 200 as illustrated in FIG. 2 and described below is not intended to be limiting.

In 210, a block to be predicted (also referred to as a block for brevity) in an image frame may be obtained. Operation 210 may be implemented by an acquisition module 910. A block may refer to a coding unit (CU). As used herein, the obtaining the block to be predicted may refer to obtaining information related to the block to be predicated. The information related to the block to be predicted may include characteristics of the block to be predicted, such as pixel values of the block to be predicted, a position of the block to be predicted in the image frame. The block to be predicted may refer to a block whose prediction mode has not been determined and has not been predicted. In some embodiments, the block to be predicted may be previously obtained and stored in a storage device (e.g., a storage 1020). The block to be predicted may be obtained from the storage device via a network.

In 220, a target division mode of the block may be determined based on a plurality of division modes of the block. Operation 220 may be implemented by a determination module 920.

A division mode of the block may be used to divide the block. In some embodiments, the division mode of the block may be defined by a division direction (e.g., a horizontal division, a vertical division), a count of sub-blocks obtained based on the division mode (or a count of division boundaries in the division mode), and a division proportion of the block. If any one of the division direction, the count of sub-blocks obtained based on the division mode (or the count of division boundaries in the division mode), and the division proportion of the division mode is different, the division mode is different. The division proportion of the block may refer to a proportion of widths of sub-blocks obtained based on the vertical division of the block or a proportion of heights of sub-blocks obtained based on the horizontal division of the block.

In some embodiments, the plurality of division modes may include an equal division mode that is configured to divide the block into multiple sub-blocks with a same size. The same size may refer to that the multiple sub-blocks have the same side length and area. A count of the multiple sub-blocks may be a natural number greater than 1. More descriptions regarding the equal division mode may be found elsewhere in the present disclosure, for example, FIG. 3A and relevant descriptions thereof.

In some embodiments, the plurality of division modes may further include at least one derivative division mode based on an equal division mode. The at least one derivative division mode based on an equal division mode may be obtained by removing a count of division boundaries from the equal division mode. The count of division boundaries may be greater than or equal to 1 and less than a difference between a count of the multiple sub-blocks obtained based on the equal division mode and 1. More descriptions regarding the at least one derivative division mode of the equal division mode may be found elsewhere in the present disclosure, for example, FIG. 3B, FIG. 3C, FIG. 3D, FIG. 3E, FIG. 3F, and relevant descriptions thereof.

In some embodiments, the plurality of division modes may include a combination division mode. The combination division mode may include a first division mode and a second division mode that is different from the second division mode. The combination division mode may be configured to divide the block into multiple sub-blocks based on the first division mode and further divide at least one of the multiple sub-blocks based on the second division mode. In some embodiments, the first division mode and the second division mode may be equal division modes. For example, the first division mode and the second division mode may be two equal division modes. The first division mode may divide the block into 2 sub-blocks with a same size, and the second division mode may divide any one of the 2 sub-blocks into 2 sub-blocks with a same size. In some embodiments, the first division mode may be a derivative division mode of the equal division mode, and the second division mode may be an equal division mode. For example, the first division mode may be a derivative division mode based on a four equal division mode, the second division mode may be an equal division mode. More descriptions regarding the combination division mode may be found elsewhere in the present disclosure, for example, FIG. 4, FIG. 5, FIG. 5B, and relevant descriptions thereof.

In some embodiments, the plurality of division modes may include a step division mode with a stepped division boundary. The step division mode may include horizontal division and vertical division, which is more flexible than only horizontal division or only vertical division. Compared with a diagonal division that requires a prescribed division angle, the step division mode is simpler and has a lower cost in encoding and decoding, that is the step division mode consumes fewer bits and has a smaller amount of data. The stepped division boundary may be composed of alternate vertical boundaries and horizontal boundaries. A vertical boundary and a horizontal boundary may form a step. The stepped division boundary may be composed of multiple steps. A count of the multiple steps may be determined based on a count of the vertical boundaries or the horizontal boundaries. In some embodiments, the step division mode may be determined based on a beginning position of the division of the block or a division direction of the division of the block. The beginning position and the division direction may be preset. Specifically, a plurality of candidate starting positions and division directions may be preset, and then a beginning position and the division direction with a best prediction effect may be selected from the plurality of candidate starting positions and division directions based on the texture feature of the block. A boundary of the texture of the block may be determined by using a filter, and then the beginning position and the division direction can be determined based on the boundary of the texture of the block. More descriptions regarding the combination division mode may be found elsewhere in the present disclosure, for example, FIG. 4, FIGS. 6A-6C, FIGS. 7A-7D, and relevant descriptions thereof.

In some embodiments, a division mode may be selected, according to a size of the block and a type of the image frame including the block, from the plurality of division modes as a target division mode of the block.

In some embodiments, costs of the plurality of division modes may be compared. A cost of a division mode may refer to a prediction cost of the intra prediction or inter prediction of the block based on the division mode. Further, a division mode with a smallest cost may be designated from the plurality of division modes as the target division mode of the block. Information (e.g., the division proportion, the division manner, etc.) associated with the target division mode of the block may be recorded in the block.

In 230, the block may be divided into a plurality of sub-blocks based on the target division mode. Operation 230 may be implemented by a division module 930. For example, the block may be divided into the plurality of sub-blocks based on the information (e.g., a division manner, a division proportion) associated with the target division mode.

In some embodiments, a division condition may be determined based on at least one of a size of the block or a type of the image frame. Further, whether the target division mode is suitable for the block may be determined based on the division condition. For example, in response to a determination that the target division mode is suitable for the block, the block may be divided into the plurality of sub-blocks based on the target division mode.

In some embodiments, the division condition of the block may be a default setting of the system 100 or set by a user manually. For example, the division condition of the block may be that the block is suitable for an arbitrary division mode, or the block is suitable for one or more specified division modes.

In some embodiments, the division condition of the block may be determined based on the size of the block. For example, whether a certain division mode may be suitable for the block may be determined based on a width and/or a height of the block. If the width and/or the height of the block satisfies a size condition, the certain division mode may be suitable for the block. If the width and/or the height of the block does not satisfy the condition, the certain division mode may not be suitable for the block. In some embodiments, if a ratio of the width and height of the block satisfies a ratio condition, the width and/or the height of the block satisfies the condition. If the ratio of the width and height of the block does not satisfy the ratio condition, the width and/or the height of the block does not satisfy the condition. For example, a vertical division mode at a division proportion of 1:3:4 may be suitable for the block when the ratio of the width and height of the block is greater than 4 and less than or equal to 8. For example, the vertical division at the division proportion of 1:3:4 may be suitable for the block with a size of 32×4 (the width of the block×the height of the block).

In some embodiments, a width and/or a height of a smallest sub-block of sub-blocks obtained by dividing the block based on a certain division mode may be determined, and then whether the certain division mode may be suitable for the block may be determined based on the width and/or the height of the smallest sub-block. In some embodiments, if the width and/or the height of the smallest sub-block is larger than or equal to a threshold, the certain division mode may be suitable for the block. If the width and/or the height of the smallest sub-block is less than the threshold, the certain division mode may not be suitable for the block. For example, when the width and/or the height of the smallest sub-block is less than 4, the certain division mode may be not suitable for the block. For example, a block with a size of 15×9 (the width of the block×the height of the block) may be divided into a sub-block with a size of 5×9 and a sub-block with a size of 10×9 based on a vertical division mode at a division proportion of 1:2 or 2:1. In such cases, the width and/or the height of the smallest sub-block (i.e., the sub-block with the size of 5×9) is larger than 4, so that the vertical division mode at the division proportion of 1:2 or 2:1 may be suitable for the block. As another example, the block with the size of 15×9 may be divided into a sub-block with a size of 15×3 and a sub-block with a size of 15×6 based on a horizontal division mode at a division proportion of 1:2 or 2:1. In such cases, the height of the smallest sub-block (i.e., the sub-block with the size of 15×3) is less than 4, so that the horizontal division mode at the division proportion of 1:2 or 2:1 may not be suitable for the block.

In some embodiments, the division condition of the block may be determined based on the type of the image frame. Whether a certain division mode may be suitable for the block may be determined based on the type of the image frame. In some embodiments, the type of the image frame may include I-frame, P-frame, or B-frame. In some embodiments, the type of the image frame may include intra frame and inter frame. Different types of image frames may be suitable for different division modes. For example, the step division mode may be suitable for blocks in the inter frame. The division condition may be set based on actual application scenarios.

According to the above embodiments in the present disclosure, the target division mode of the block is determined based on one or more division modes from rich division modes, so that the determined target division mode of the block may adapt to the image texture of the image frame more flexibly, thereby improving the efficiency of the video coding.

In some embodiments, at a codec end (e.g., the encoder 120 or the decoder 140 illustrated in FIG. 1), only one division proportion may be set. When the target division mode is the step division mode, the codec end may divide the block using the division proportion.

In some embodiments, whether the step division mode is used and an index of a division proportion of the step division mode may be included the codec end.

In some embodiments, multiple candidate division proportions may be set at the codec end. During a process of encoding the block, an index, in a list of the multiple candidate division proportions, of a division proportion that is selected from the multiple candidate division proportions to divide the block may be transmitted.

Figure 6A:
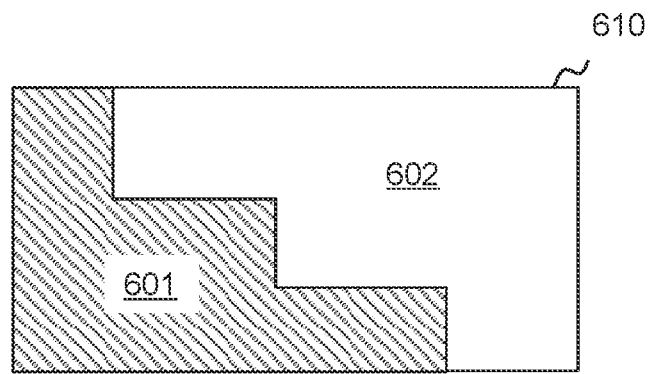
FIG. 6A is a schematic diagram illustrating an exemplary step division mode according to some embodiments of the present disclosure.
Figure 6B:
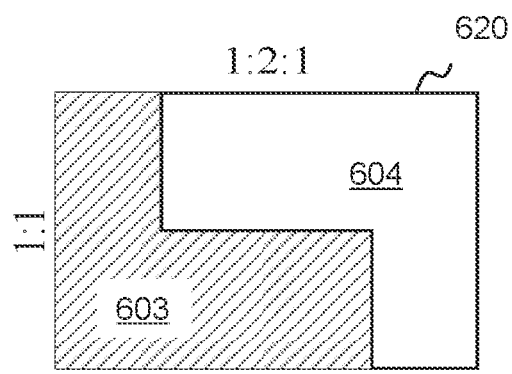
FIG. 6B is a schematic diagram illustrating an exemplary step division mode according to some embodiments of the present disclosure.
Figure 6C:
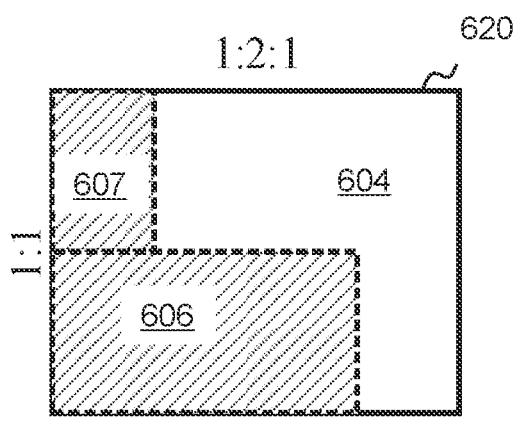
FIG. 6C is a schematic diagram illustrating an exemplary division mode obtained by adjusting the step division mode in FIG. 6 according to some embodiments of the present disclosure.

For example, as shown in FIG. 6B, at the codec end, a division proportion in a vertical direction may be set as 1:2:1 and a division proportion in a horizontal direction may be set as 1:1. When the step division mode is selected to divide a block 620, the codec end may divide the block 620 based on the step division mode and the division proportions 1:2:1 and 1:1 to obtain two sub-blocks 603 and 604. In some embodiments, the obtained sub-block 603 and/or the sub-block 604 may not be further divided. In some embodiments, the obtained sub-block 603 and/or the sub-block 604 may be further divided. For example, as shown in FIG. 6C, the obtained sub-block 603 may be further divided into two sub-blocks 606 and 607 in a horizontal direction.

In 240, the block may be encoded based on the plurality of sub-blocks. In some embodiments, operation 240 may be implemented by an encoding module 940.

In some embodiments, the block may be encoded based on an index of the target division mode. The index of the target division mode may refer to data or identification that is used to point to the target division mode among the plurality of division modes. By the index of the target division mode, the codec end may directly locate the target division mode without scanning all division modes in the plurality of division modes.

In some embodiments, the index of the target division mode may be obtained by numbering the target division mode.

In some embodiments, indexes of the plurality of division modes may be obtained by numbering the plurality of division modes. An index may be selected from the indexes of the plurality of division modes and transmitted to identify the target division mode that is used to divide the block.

Figure 8:
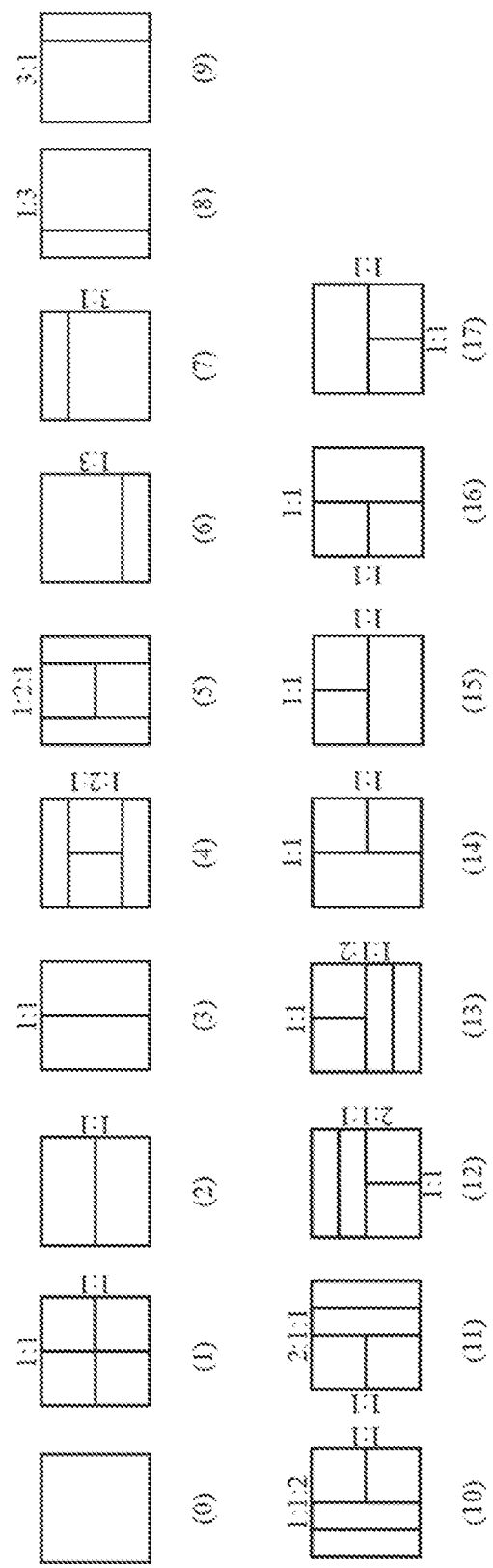
FIG. 8 is a schematic diagram illustrating exemplary corresponding relationships between a value of a syntax and a division mode according to some embodiments of the present disclosure.

For example, in an audio video coding standard 3 (AVS3), a syntax "split_flag" may be used to indicate the target division mode of the block used by the codec end. FIG. 8 is a schematic diagram illustrating exemplary corresponding relationships between a value of a syntax and a division mode according to some embodiments of the present disclosure. As shown in FIG. 8, a value in a bracket may be a value of a syntax "split_flag" corresponding to a division mode. Values of (1)-(17) shown in FIG. 8 may correspond to seventeen different division modes, respectively.

The following are three transmission manners of a syntax corresponding to the step division mode.

In the transmission manner (1), only one division proportion may be set at the codec end. When the step division mode is selected as the target division mode of the block, the codec end may divide the block using the division proportion. In such cases, a syntax that indicates whether the step division mode is selected to divide the block may be needed.

In the transmission manner (2), multiple candidate division proportions may be set at the codec end. An index, in a list of the multiple candidate division proportions, of a division proportion that is selected from the multiple candidate division proportions to divide the block may be transmitted. In such cases, indexes of the multiple candidate division proportions may be determined by numbering the multiple candidate division proportions. In addition, the syntax that indicates whether the step division mode is selected to divide the block may be needed. If the step division mode is selected to divide the block, a syntax that indicates an index corresponding to the step division mode may be transmitted.

In the transmission manner (3), an initial division proportion of the block may be obtained based on the texture feature of the block. Further, the initial division proportion may be adjusted to obtain multiple adjusted division proportions. A target division proportion of the block may be obtained by traversing the multiple adjusted division proportions, and then the target division proportion of the block may be transmitted. In such cases, the syntax that indicates whether the step division mode is selected to divide the block may be needed. If the step division mode is selected to divide the block, a syntax that indicates a count of a plurality of sub-blocks that is obtained by dividing the block along the width of the block, a syntax that indicates a count of a plurality of sub-blocks that is obtained by dividing the block along the height of the block, and a syntax that indicates the target division proportion of the block may be transmitted.

For example, a syntax "split_stairs_enable_flag" may indicate that whether the step division mode is selected to divide the block. When a value of the syntax "split_stairs_enable_flag" is 1, the step division mode may be selected to divide the block. When the value of the syntax "split_stairs_enable_flag" is 0, the step division mode may not be selected to divide the block.

In some embodiments, the multiple candidate division proportions of the width or height of the block may be set as {1:1, 1:2, 1:3, 2:1, 3:1, 1:1:1, 1:2:1, 2:1:1, 1:1:1:1}, and the corresponding indexes of the multiple candidate division proportions may be set as {0, 1, 2, 3, 4, 5, 6, 7, 8, 9}. A syntax "split_stairs_hor_flag" may indicate an index of the target division proportion of the block in a horizontal direction, that is, an index of the target division proportion of the height of the block. A syntax "split_stairs_ver_flag" may indicate an index of the target division proportion of the block in a vertical direction, that is, an index of the target division proportion of the width of the block. When the value of the syntax "split_stairs_enable_flag" is 1, the syntaxes "split_stairs_hor_flag" and "split_stairs_ver_flag" may be transmitted to record the target division proportion. According to the above description, the values of the syntax "split_stairs_enable_flag," the syntax "split_stairs_hor_flag," and the syntax "split_stairs_ver_flag" corresponding to the division mode of the block 620 as shown in FIG. 6B may be 1, 0, and 6, respectively.

According to the above embodiments in the present disclosure, the division modes may enrich the division of the block, so that the division of the block may adapt to the image texture of the image frame more flexibly, thereby improving the efficiency of video coding.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 3A:
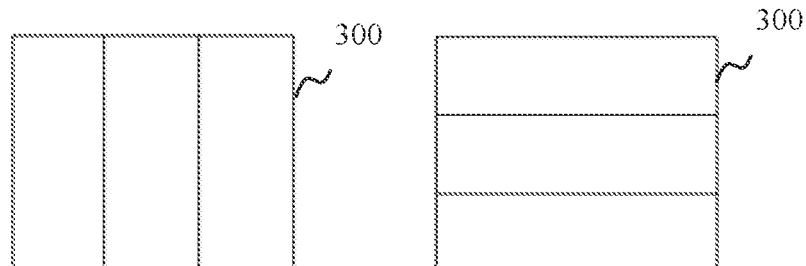
FIG. 3A is a schematic diagram illustrating exemplary equal division modes according to some embodiments of the present disclosure.
Figure 3A:
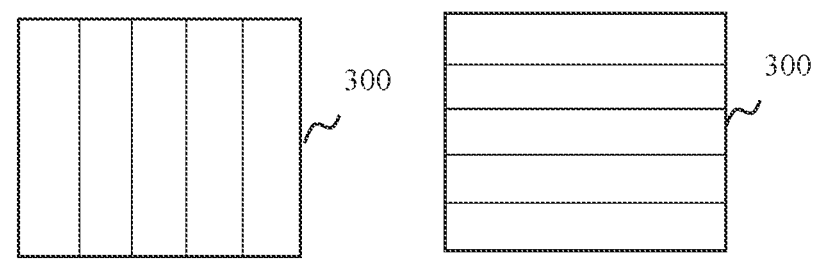
Figure 3A:
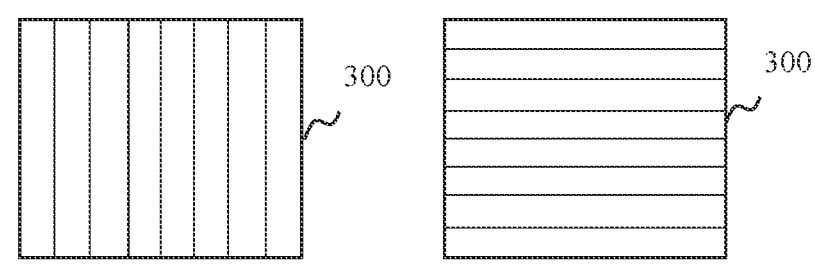

FIG. 3A is a schematic diagram illustrating exemplary equal division modes according to some embodiments of the present disclosure. In some embodiments, an equal division mode may be configured to divide the block into the multiple sub-blocks with a same size by the vertical division or the horizontal division.

As shown in FIG. 3A, Mode 1-Mode 6 belong to equal division modes. Mode 1, Mode 3, and Mode 5 belong to vertical division modes; and Mode 2, Mode 4, and Mode 6 belong to horizontal division modes. Mode 1 and Mode 2 may be used to divide a block 300 into 3 sub-blocks with a same size. In such cases, Mode 1 and Mode 2 may be referred as to three equal division modes. Mode 1 may also be referred as to a vertical three equal division mode. Mode 2 may also be referred as to a horizontal three equal division mode. Mode 3 and Mode 4 may be used to divide a block 300 into 5 sub-blocks with a same size. In such cases, Mode 3 and Mode 4 may be referred as to five equal division modes. Mode 3 may also be referred as to a vertical five equal division mode. Mode 4 may also be referred as to a horizontal five equal division mode. Mode 5 and Mode 6 may be used to divide a block 300 into 8 sub-blocks with a same size. In such cases, Mode 5 and Mode 6 may be referred as to eight equal division modes. Mode 5 may also be referred as to a vertical eight equal division mode. Mode 6 may also be referred as to a horizontal eight equal division mode.

Figure 3B:
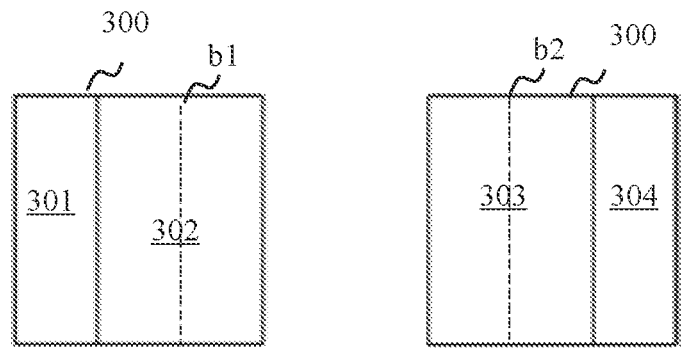
FIG. 3B is a schematic diagram illustrating exemplary derivative division modes based on an equal division mode according to some embodiments of the present disclosure.
Figure 3B:
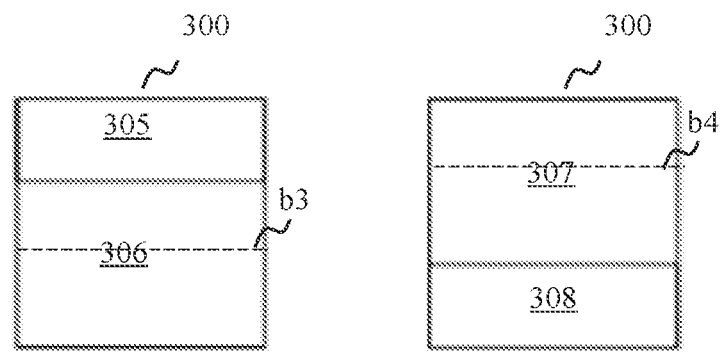

FIG. 3B is a schematic diagram illustrating exemplary derivative division modes based on an equal division mode according to some embodiments of the present disclosure. As shown in FIG. 3B, Mode 7-Mode 10 are derivative division modes derived from a three equal division mode. The count of multiple sub-blocks obtained based on the three equal division mode is equal to 3. A count of division boundaries used in the three equal division mode is 2. Further, Mode 7-Mode 10 are formed by removing the certain count (i.e., 1 as shown in FIG. 3B) of division boundaries from the two division boundaries used in the three equal division mode. That is, the block 300 may be divided into 2 sub-blocks at a division proportion of 1:2 or 2:1 based on a derivative division mode derived from the three equal division mode by removing 1 division boundary from the two division boundaries used in the three equal division mode.

As shown in Mode 7 in FIG. 3B, a division boundary b1 may be removed from the two division boundaries used in the three equal division mode (i.e., Mode 1) to obtain a derivative division mode (i.e., Mode 7) that is derived from the three equal division mode (e.g., Mode 1), and the block 300 may be divided into two sub-blocks 301 and 302 by the derivative division mode at a division proportion of 1:2. As shown in Mode 8 in FIG. 3B, a boundary division b2 may be removed from the two division boundaries used in the three equal division mode (i.e., Mode 1) to obtain a derivative division mode (i.e., Mode 8) that is derived from the three equal division mode (i.e., Mode 1), and the block 300 may be divided into two sub-blocks 303 and 304 by the derivative division mode at a division proportion of 2:1. As shown in Mode 9 in FIG. 3B, a division boundary b3 may be removed from the two division boundaries used in the three equal division mode (i.e., Mode 2) to obtain a derivative division mode (i.e., Mode 9) that is derived from the three equal division mode (i.e., Mode 2), and the block 300 may be divided into two sub-blocks 305 and 306 by the derivative division mode at a division proportion of 1:2. As shown in Mode 10 in FIG. 3B, a division boundary b4 may be removed from the two division boundaries used in the three equal division mode (i.e., Mode 2) to obtain a derivative division mode (i.e., Mode 10) that is derived from the three equal division mode (i.e., Mode 2), and the block 300 may be divided into two sub-blocks 307 and 308 by the derivative division mode at a division proportion of 2:1.

Figure 3C:
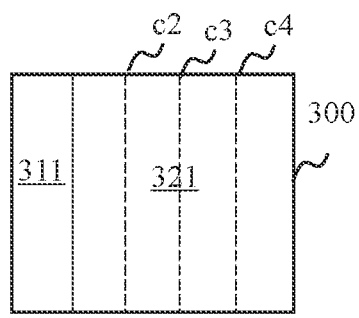
FIG. 3C is a schematic diagram illustrating exemplary derivative division modes based on an equal division mode according to some embodiments of the present disclosure.
Figure 3C:
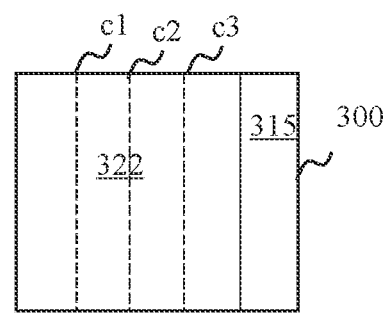
Figure 3C:
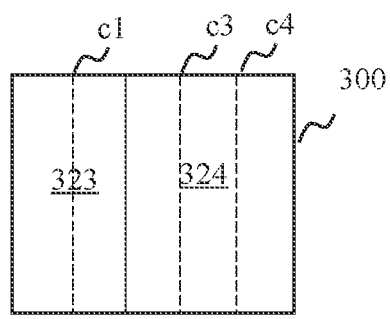
Figure 3C:
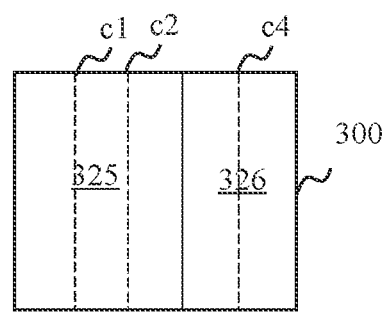

FIG. 3C is a schematic diagram illustrating exemplary derivative division modes based on an equal division mode according to some embodiments of the present disclosure. As shown in FIG. 3C, Mode 11-Mode 14 are derivative division modes derived from a five equal division mode. The count of multiple sub-blocks obtained based on the five equal division mode is equal to 5. A count of division boundaries used in the five equal division mode is 4. Further, Mode 11-Mode 14 are formed by removing the certain count (i.e., 3 as shown in FIG. 3C) of division boundaries from five division boundaries used in the five equal division mode. That is, the block 300 may be divided into 2 sub-blocks at a division proportion of 1:4, 4:1, 2:3, or 3:2 based on a derivative division mode derived from the five equal division mode by removing 3 division boundaries from the five division boundaries used in the five equal division mode.

As shown in Mode 11 in FIG. 3C, division boundaries c2, c3, and c4 may be removed from the five division boundaries used in the five equal division mode (i.e., Mode 3) to obtain a derivative division mode (i.e., Mode 11) that is derived from the five equal division mode (i.e., Mode 3), and the block 300 may be divided into two sub-blocks 311 and 321 by the derivative division mode at a division proportion of 1:4. As shown in Mode 12 in FIG. 3C, division boundaries c1, c2, and c3 may be removed from the five division boundaries used in the five equal division mode (i.e., Mode 3) to obtain a derivative division mode (i.e., Mode 12) that is derived from the five equal division mode (i.e., Mode 3), and the block 300 may be divided into two sub-blocks 322 and 315 by the derivative division mode at a division proportion of 4:1. As shown in Mode 13 in FIG. 3C, division boundaries c1, c3, and c4 may be removed from the five division boundaries used in the five equal division mode (i.e., Mode 3) to obtain a derivative division mode (i.e., Mode 13) that is derived from the five equal division mode (i.e., Mode 3), and the block 300 may be divided into two sub-blocks 323 and 324 by the derivative division mode at a division proportion of 2:3. As shown in Mode 14 in FIG. 3C, division boundaries c1, c2, and c4 may be removed from the five division boundaries used in the five equal division mode (i.e., Mode 3) to obtain a derivative division mode (i.e., Mode 14) that is derived from the five equal division mode (i.e., Mode 3), and the block 300 may be divided into two sub-blocks 325 and 326 by the derivative division mode at a division proportion of 2:3.

Figure 3D:
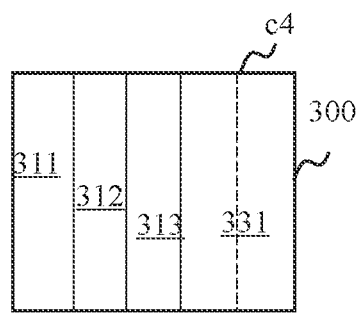
FIG. 3D is a schematic diagram illustrating exemplary derivative division modes based on an equal division mode according to some embodiments of the present disclosure.
Figure 3D:
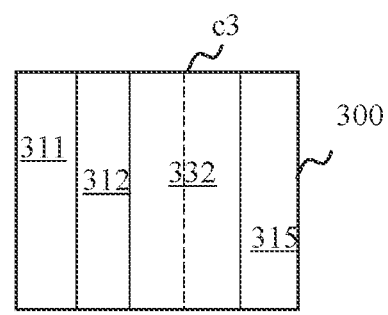
Figure 3D:
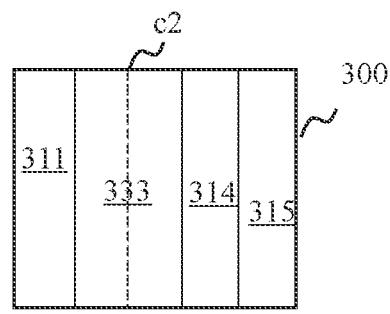
Figure 3D:
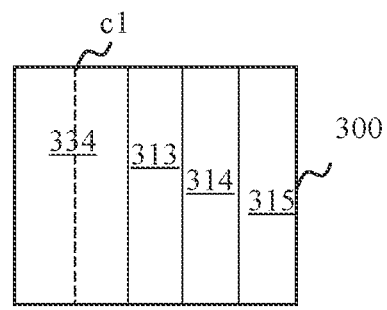

FIG. 3D is a schematic diagram illustrating exemplary derivative division modes based on an equal division mode according to some embodiments of the present disclosure. As shown in FIG. 3D, Mode 15-Mode 18 are derivative division modes derived from a five equal division mode. The count of multiple sub-blocks obtained based on the five equal division mode is equal to 5. A count of division boundaries used in the five equal division mode is 4. Further, Mode 15-Mode 18 are formed by removing the certain count of division boundaries from five division boundaries used in the five equal division mode. That is, the block 300 may be divided into 4 sub-blocks at a division proportion of 1:1:1:2, 1:1:2:1, 1:2:1:1, or 2:1:1:1 based on a derivative division mode derived from the five equal division mode by removing 1 division boundary from the five division boundaries used in the five equal division mode.

As shown in Mode 15 in FIG. 3D, a division boundary c4 may be removed from the five division boundaries used in the five equal division mode (i.e., Mode 3) to obtain a derivative division mode (i.e., Mode 15) that is derived from the five equal division mode (i.e., Mode 3), and the block 300 may be divided into four sub-blocks 311, 312, 313, and 331 by the derivative division mode at a division proportion of 1:1:1:2. As shown in Mode 16 in FIG. 3D, a division boundary c3 may be removed from the five division boundaries used in the five equal division mode (i.e., Mode 3) to obtain a derivative division mode (i.e., Mode 16) that is derived from the five equal division mode (i.e., Mode 3), and the block 300 may be divided into four sub-blocks 311, 312, 332, and 315 by the derivative division mode at a division proportion of 1:1:2:1 As shown in Mode 17 in FIG. 3D, a division boundary c2 may be removed from the five division boundaries used in the five equal division mode (i.e., Mode 3) to obtain a derivative division mode (i.e., Mode 17) that is derived from the five equal division mode (i.e., Mode 3), and the block 300 may be divided into four sub-blocks 311, 333, 314, and 315 by the derivative division mode at a division proportion of 1:2:1:1. As shown in Mode 18 in FIG. 3D, a division boundary c1 may be removed from the five division boundaries used in the five equal division mode (i.e., Mode 3) to obtain a derivative division mode (i.e., Mode 18) that is derived from the five equal division mode (i.e., Mode 3), and the block 300 may be divided into four sub-blocks 334, 313, 314, and 315 by the derivative division mode at a division proportion of 2:1:1:1.

Figure 3E:
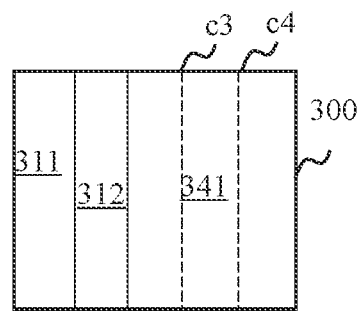
FIG. 3E is a schematic diagram illustrating exemplary derivative division modes based on an equal division mode according to some embodiments of the present disclosure.
Figure 3E:
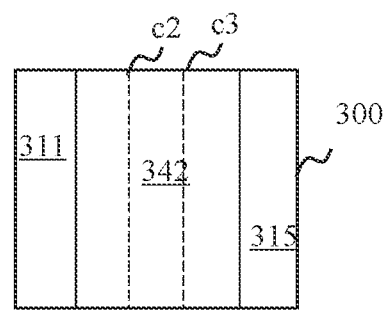
Figure 3E:
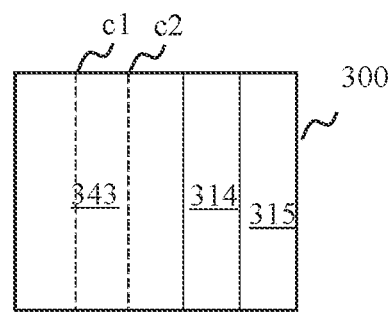
Figure 3E:
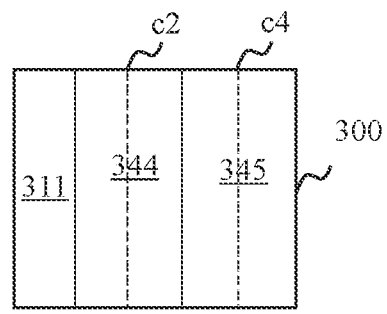
Figure 3E:
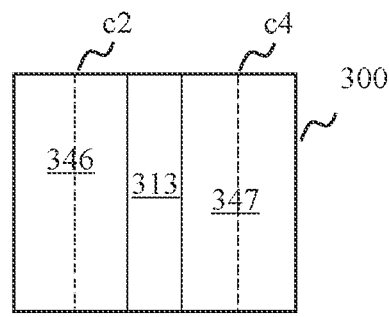
Figure 3E:
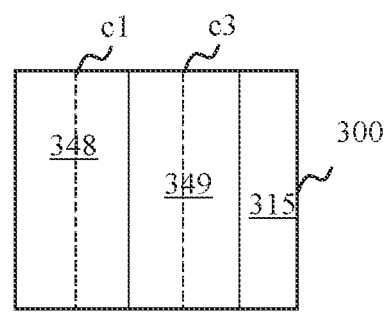

FIG. 3E is a schematic diagram illustrating exemplary derivative division modes based on an equal division mode according to some embodiments of the present disclosure. As shown in FIG. 3E, Mode 19-Mode 24 are derivative division modes derived from a five equal division mode. The count of multiple sub-blocks obtained based on the five equal division mode is equal to 5. A count of division boundaries used in the five equal division mode is 4. Further, Mode 19-Mode 24 are formed by removing the certain count (i.e., 2 as shown in FIG. 3E) of division boundaries from five division boundaries used in the five equal division mode. That is, the block 300 may be divided into 3 sub-blocks at a division proportion of 1:1:3, 1:3:1, 3:1:1, 1:2:2, 2:1:2, or 2:2:1 based on a derivative division mode derived from the five equal division mode by removing 2 division boundaries from the five division boundaries used in the five equal division mode.

As shown in Mode 19 in FIG. 3E, division boundaries c3 and c4 may be removed from the five division boundaries used in the five equal division mode (i.e., Mode 3) to obtain a derivative division mode (i.e., Mode 19) that is derived from the five equal division mode (i.e., Mode 3), and the block 300 may be divided into four sub-blocks 311, 312, and 341 by the derivative division mode at a division proportion of 1:1:3. As shown in Mode 20 in FIG. 3E, division boundaries c2 and c3 may be removed from the five division boundaries used in the five equal division mode (i.e., Mode 3) to obtain a derivative division mode (i.e., Mode 20) that is derived from the five equal division mode (i.e., Mode 3), and the block 300 may be divided into four sub-blocks 311, 342, and 315 by the derivative division mode at a division proportion of 1:3:1. As shown in Mode 21 in FIG. 3E, division boundaries c1 and c2 may be removed from the five division boundaries used in the five equal division mode (i.e., Mode 3) to obtain a derivative division mode (i.e., Mode 21) that is derived from the five equal division mode (i.e., Mode 3), and the block 300 may be divided into four sub-blocks 343, 314, and 315 by the derivative division mode at a division proportion of 3:1:1. As shown in Mode 22 in FIG. 3E, division boundaries c2 and c4 may be removed from the five division boundaries used in the five equal division mode (i.e., Mode 3) to obtain a derivative division mode (i.e., Mode 22) that is derived from the five equal division mode (i.e., Mode 3), and the block 300 may be divided into four sub-blocks 311, 344, and 345 by the derivative division mode at a division proportion of 1:2:2. As shown in Mode 23 in FIG. 3E, division boundaries c2 and c4 may be removed from the five division boundaries used in the five equal division mode (i.e., Mode 3) to obtain a derivative division mode (i.e., Mode 23) that is derived from the five equal division mode (i.e., Mode 3), and the block 300 may be divided into four sub-blocks 346, 313, and 347 by the derivative division mode at a division proportion of 2:1:2. As shown in Mode 24 in FIG. 3E, division boundaries c1 and c3 may be removed from the five division boundaries used in the five equal division mode (i.e., Mode 3) to obtain a derivative division mode (i.e., Mode 24) that is derived from the five equal division mode (i.e., Mode 3), and the block 300 may be divided into four sub-blocks 348, 349, and 315 by the derivative division mode at a division proportion of 2:2:1.

Figure 3F:
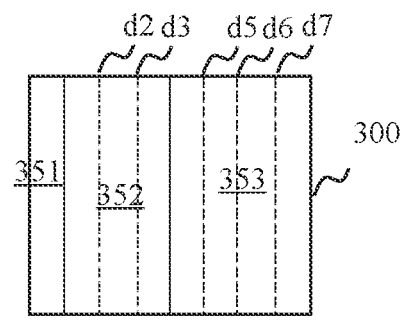
FIG. 3F is a schematic diagram illustrating an exemplary derivative division mode based on an equal division mode according to some embodiments of the present disclosure.

FIG. 3F is a schematic diagram illustrating an exemplary derivative division mode based on an equal division mode according to some embodiments of the present disclosure. As shown in FIG. 3F, Mode 25 is a derivative division mode derived from an eight equal division mode. The count of multiple sub-blocks obtained based on the eight equal division mode is equal to 8. A count of division boundaries used in the eight equal division mode is 7. Further, Mode 25 is formed by removing the certain count (i.e., 5 as shown in FIG. 3F) of division boundaries from seven division boundaries used in the eight equal division mode. That is, the block 300 may be divided into 3 sub-blocks at a division proportion of, for example, 1:3:4 based on a derivative division mode derived from the eight equal division mode by removing 5 division boundaries from the seven division boundaries used in the eight equal division mode.

As shown in FIG. 3F, division boundaries d2, d3, d5, d6, and c7 may be removed from the seven division boundaries used in the eight equal division mode (i.e., Mode 5) to obtain a derivative division mode (i.e., Mode 25) that is derived from the eight equal division mode (i.e., Mode 5), and the block 300 may be divided into two sub-blocks 351, 352, and 353 by the derivative division mode at a division proportion of 1:3:4.

It should be noted that the above embodiments are merely provided for the purposes of illustration, and not intended to limit the scope of the present disclosure. For example, the count of the multiple sub-blocks obtained based on the equal division mode may also include, for example, 6, 7, 9, 10, or the like, that is, the equal division mode may also be a six equal division mode, a seven equal division mode, a nine equal division mode, or a ten equal division mode, or the like.

According to the above embodiments in the present disclosure, one or more derivative division modes may be obtained by removing one or more division boundaries from the equal division mode, which increases a count of the plurality of division modes. As a result, the target division mode of the block determined based on the plurality of division modes may adapt to the image texture of the image frame more flexibly, thereby improving the efficiency of the video coding.

Figure 4:
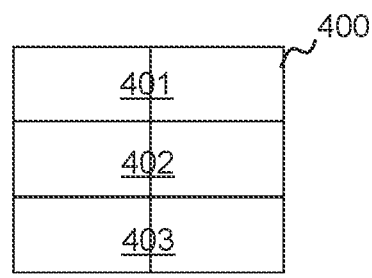
FIG. 4 is a schematic diagram illustrating an exemplary combination division mode according to some embodiments of the present disclosure.

FIG. 4 is a schematic diagram illustrating an exemplary combination division mode according to some embodiments of the present disclosure.

In some embodiments, the combination division mode may include a first division mode and a second division mode. A dividing direction of the first division mode may be vertical to a dividing direction of the second division mode. In some embodiments, one of the first division mode and the second division mode may be a horizontal division mode that is configured to divide the block in a horizontal direction, and the other of the first division mode and the second division mode may be a vertical division mode that is configured to divide the block in a vertical direction.

For example, as shown in FIG. 4, Mode 26 is a combination division mode that includes a first division mode and a second division mode. The first division mode is the horizontal division mode that divides a block 400 into 3 sub-blocks 401, 402, and 403 in the horizontal direction. The second division mode is the vertical division mode that divides each of the sub-blocks 401, 402, and 403 into two sub-blocks in the vertical direction. As a result, the block 400 is divided into 6 sub-blocks by the first division mode and the second division mode.

Figure 5A:
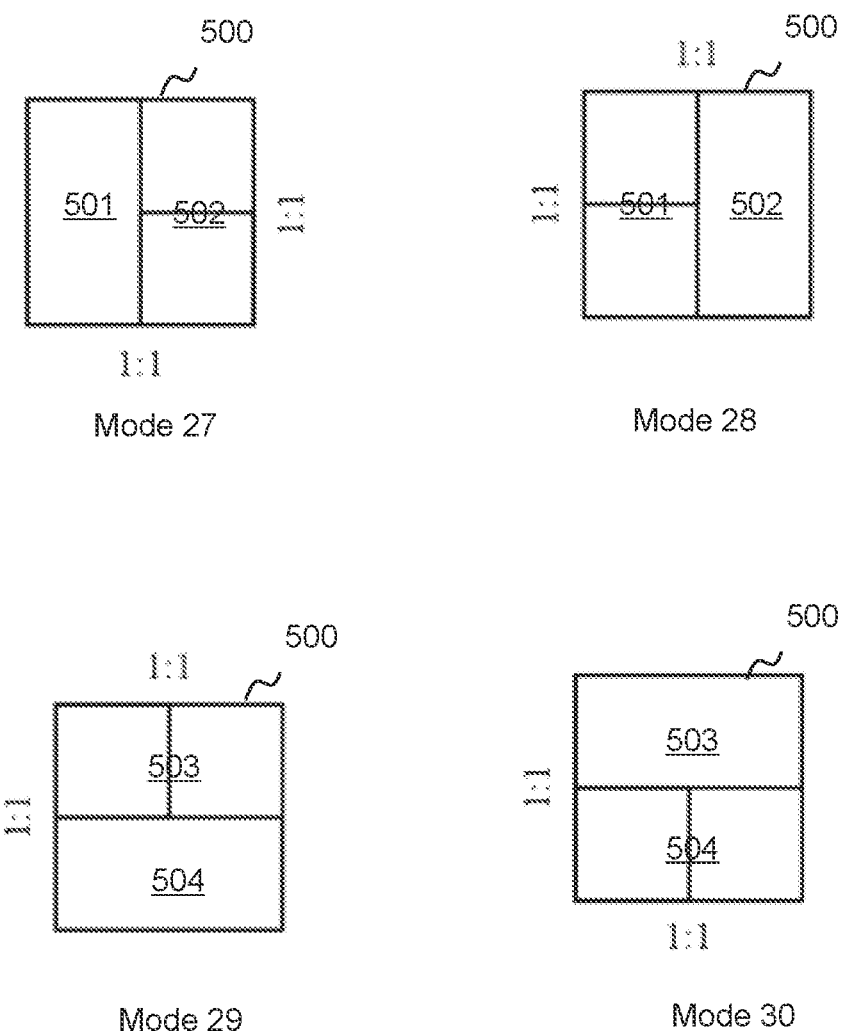
FIG. 5A is a schematic diagram illustrating exemplary combination division modes according to some embodiments of the present disclosure.

FIG. 5A is a schematic diagram illustrating exemplary combination division modes according to some embodiments of the present disclosure.

For example, as shown in FIG. 5A, Mode 27-30 are combination division modes each of which includes a first division mode and a second division mode. In Mode 27 and Mode 28, the first division mode is a two equal division mode that divides a block 500 into 2 sub-blocks 501 and 502 at a division proportion of 1:1 along a vertical direction (also referred to as a vertical two equal division mode). The second division mode is a two equal division mode that divides the sub-blocks 502 or the sub-blocks 501 into 2 sub-blocks at a division proportion of 1:1 along a horizontal direction (also referred to as a horizontal two equal division mode). As a result, the block 500 is divided into 3 sub-blocks by the first division mode and the second division mode. In Mode 29 and Mode 30, the first division mode is a two equal division mode that divides the block 500 into 2 sub-blocks 503 and 504 at a division proportion of 1:1 along the horizontal direction. The second division mode is a two equal division mode that divides the sub-blocks 503 or the sub-blocks 504 into 2 sub-blocks at a division proportion of 1:1 along the vertical direction. As a result, the block 500 is divided into 3 sub-blocks by the first division mode and the second division mode.

Figure 5B:
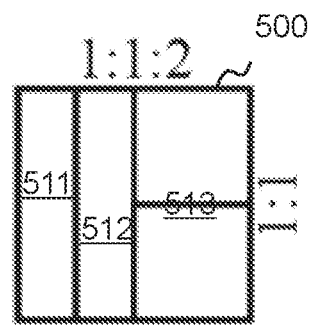
FIG. 5B is a schematic diagram illustrating exemplary combination division modes according to some embodiments of the present disclosure.
Figure 5B:
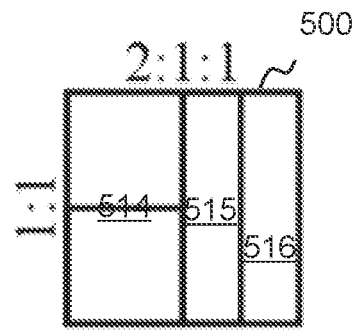
Figure 5B:
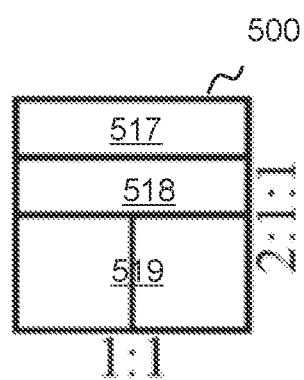
Figure 5B:
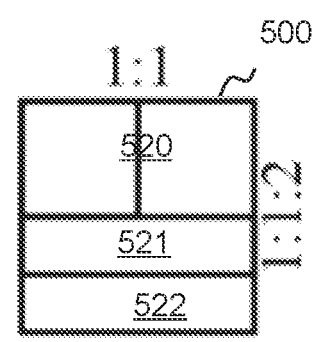

FIG. 5B is a schematic diagram illustrating exemplary combination division modes according to some embodiments of the present disclosure.

For example, as shown in FIG. 5B, Mode 30-33 are combination division modes each of which includes a first division mode and a second division mode. In Mode 30 and Mode 31, the first division mode may be a derivative division mode based on a four equal division mode that divides the block 500 into 3 sub-blocks 511, 512, and 513 at a division proportion of 1:1:2 or 3 sub-blocks 514, 515, and 516 at a division proportion of 2:1:1 along the vertical direction. The second division mode may be a two equal division mode that divides the sub-blocks 513 or the sub-blocks 514 into 2 sub-blocks at a division proportion of 1:1 along the horizontal direction. In Mode 32 and Mode 33, the first division mode may be a derivative division mode of a four equal division mode that divides the block 500 into 3 sub-blocks 517, 518, and 519 at a division proportion of 1:1:2 or 3 sub-blocks 520, 521, and 522 at a division proportion of 2:1:1 along the horizontal direction. The second division mode may be a two equal division mode that divides the sub-blocks 519 or the sub-blocks 520 into 2 sub-blocks at a division proportion of 1:1 along the vertical direction.

According to the above embodiments in the present disclosure, the combination division mode increases the count of the plurality of division modes and improves the flexibility of block division, thereby improving the efficiency of the video coding.

FIG. 6A is a schematic diagram illustrating an exemplary step division mode according to some embodiments of the present disclosure. For example, as shown in FIG. 6A, a block 610 may be divided into two sub-blocks 601 and 602 with irregular boundaries. The shape of a division boundary for the sub-block 601 and the sub-block 602 is a stepped shape.

Figure 7A:
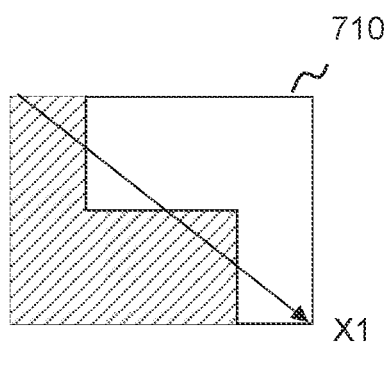
FIGS. 7A-7B are schematic diagrams illustrating exemplary division directions of step division modes according to some embodiments of the present disclosure.
Figure 7B:
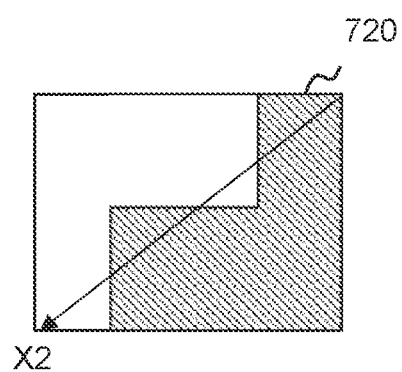

FIGS. 7A-7B are schematic diagrams illustrating exemplary division directions of step division modes according to some embodiments of the present disclosure. As shown in FIG. 7A, a division direction X1 of a block 710 may be from the top left to the bottom right of the block 710. As shown in FIG. 7B, a division direction X2 of a block 720 may be from the top right to the bottom left of the block 720.

Figure 7C:
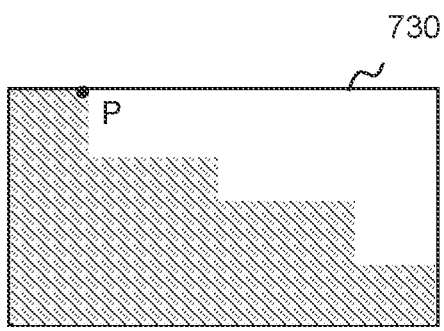
FIGS. 7C-7D are schematic diagrams illustrating exemplary beginning division positions of step division modes according to some embodiments of the present disclosure.
Figure 7D:
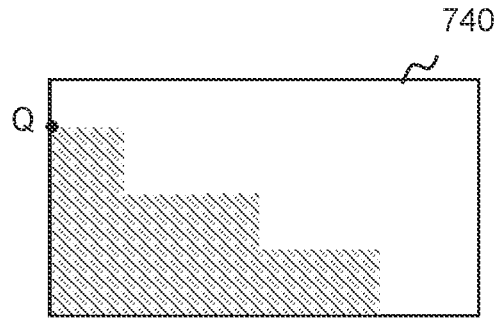

FIGS. 7C-7D are schematic diagrams illustrating exemplary beginning division positions of step division modes according to some embodiments of the present disclosure. As shown in FIG. 7C, a beginning position of the division of a block 730 may be a point P. As shown in FIG. 7D, a beginning position the division of a block 740 may be a point Q.

In some embodiments, the division proportion of a division mode of the block may be determined based on the texture feature of the block.

According to the above embodiments in the present disclosure, the plurality of division modes include the step division mode, and the sub-blocks obtained based on the step division mode having irregular boundaries, which improves the flexibility of the block division and adapts to the image texture of the image frame better, thereby improving the efficiency of the video coding.

Figure 9:
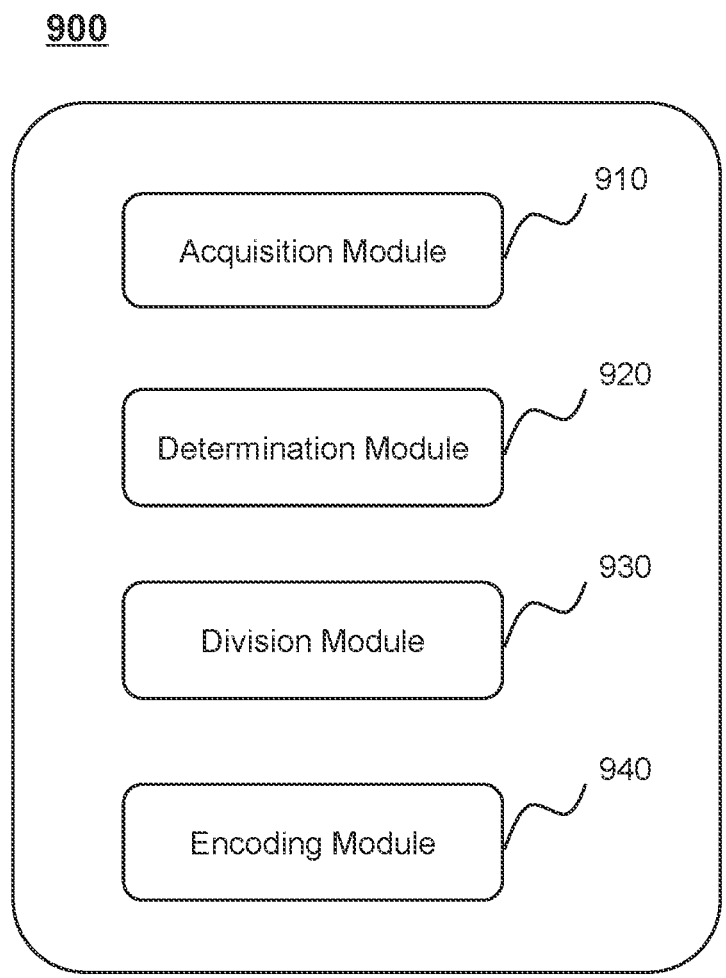
FIG. 9 is a block diagram illustrating an exemplary video processing system according to some embodiments of the present disclosure.

FIG. 9 is a block diagram illustrating an exemplary video processing system according to some embodiments of the present disclosure. As shown in FIG. 9, a video processing system 900 may include an acquisition module 910, a determination module 920, a division module 930, and an encoding module 940.

The acquisition module 910 may be configured to obtain a block to be predicted in an image frame. More descriptions regarding the obtaining of the block to be predicted may be found elsewhere in the present disclosure, for example, operation 210 in FIG. 2 and relevant descriptions thereof.

The determination module 920 may be configured to determine a target division mode of the block based on a plurality of division modes of the block. More descriptions regarding the determining of the target division mode of the block may be found elsewhere in the present disclosure, for example, operation 220 in FIG. 2 and relevant descriptions thereof.

The division module 930 may be configured to divide the block into a plurality of sub-blocks based on the target division mode. More descriptions regarding the division of the block may be found elsewhere in the present disclosure, for example, operation 230 in FIG. 2 and relevant descriptions thereof.

The encoding module 940 may be configured to encode the block based on an index of the target division mode. More descriptions regarding the encoding of the block may be found elsewhere in the present disclosure, for example, operation 240 in FIG. 2 and relevant descriptions thereof.

The modules in the video processing system 900 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units.

Figure 10:
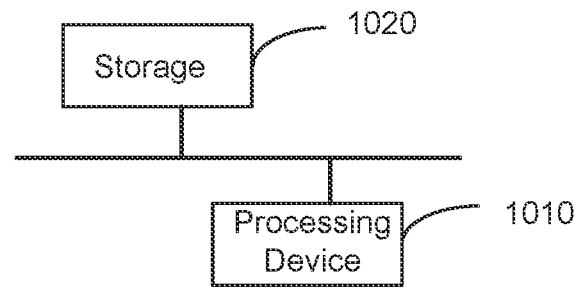
FIG. 10 is a schematic diagram illustrating an exemplary video processing device according to some embodiments of the present disclosure.

FIG. 10 is a schematic diagram illustrating an exemplary video processing device according to some embodiments of the present disclosure. In some embodiments, the video processing system 1000 and/or the video processing system 900 may be implemented by software and/or hardware, and/or may be integrated in the video processing device 1000.

As shown in FIG. 10, the video processing device 1000 may include a processing device 1010 (also referred to as a processor). The processing device may be configured to process information and/or data relating to the block division to perform one or more functions described in the present disclosure. For example, the processing device 1010 may be configured to implement any one of the embodiments or any combination thereof in the present disclosure.

In some embodiments, the processing device 1010 may include a central processing unit (CPU). In some embodiments, the processing device 1010 may include an integrated circuit chip configured to process signals. In some embodiments, the processing device 1010 may include a general-purpose processor, a digital signal processor (DSP), an application specific integrated circuit (ASIC), a field programmable gate array (FPGA), other programmable logic device, a discrete gate, a transistor logic device, a discrete hardware component, or the like, or any combination thereof. The general-purpose processor may include a microprocessor. In some embodiments, the processing device 1010 may include any conventional processor.

In some embodiments, the video processing device 1000 may include a storage 1020. The storage 1020 may be configured to store instructions and/or data required for operations of the processing device 1010. In some embodiments, the storage 1020 may include a medium that may store program codes, such as a U disk, a mobile hard disk, a read-only memory (ROM), a random access memory (RAM), a magnetic disk, an optical disk, or the like, or any combination thereof. In some embodiments, the storage 1020 may include terminal devices such as a computer, a server, a mobile phone, a tablet, or the like, or any combination thereof.

Figure 11:
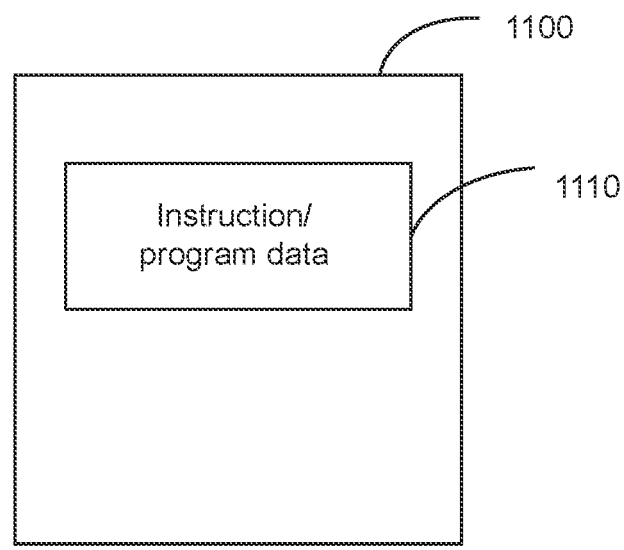
FIG. 11 is a schematic diagram illustrating an exemplary computer-readable storage medium according to some embodiments of the present disclosure.

FIG. 11 is a schematic diagram illustrating an exemplary computer-readable storage medium according to some embodiments of the present disclosure. The computer-readable storage medium 1100 may be configured to store instruction/program data 1110. When the instruction/program data 1110 is executed, any one of the embodiments of the block division method may be implemented. In some embodiments, the instruction/program data 1110 may be in a form of a program file and stored in the storage 1120 in a form of a software product. A computer device (e.g., the video processing system 100, the video processing system 900, the video processing device 1000) personal computer, a server, or a network device, etc.) or a processor may perform all or part of the operations of the embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method, comprising:
obtaining a block to be predicted in an image frame;
determining a division condition based on at least one of a size of the block or a type of the image frame;
determining, based on a plurality of division modes of the block, a target division mode of the block, the plurality of division modes including an equal division mode that is configured to divide the block into multiple sub-blocks with a same size;
dividing, based on the target division mode, the block into a plurality of sub-blocks, includes:
  determining whether the target division mode is suitable for the block based on the division condition; and
  in response to a determination that the target division model is suitable for the block, dividing the block, based on the target division mode, into the plurality of sub-blocks; and
encoding the block based on the plurality of sub-blocks.

2. The method of claim 1, wherein the plurality of division modes further include at least one derivative division mode based on the equal division mode, the at least one derivative division mode being formed by removing a count of division boundaries used in the equal division mode, the count being greater than or equal to 1 and less than a difference between a count of the multiple of sub-blocks and 1.

3. The method of claim 1, wherein the plurality of division modes further include a combination division mode, the combination division mode including a first division mode and a second division mode, and being configured to divide the block into multiple sub-blocks based on the first division mode and further divide at least one of the multiple sub-blocks based on the second division mode, wherein the first division mode and the second division mode are equal division modes or derivative division modes.

4. The method of claim 3, wherein one of the first division mode and the second division mode is a horizontal division mode that is configured to divide the block in a horizontal direction, the other of the first division mode and the second division mode is a vertical division mode that is configured to divide the block in a vertical direction.

5. The method of claim 1, wherein the plurality of division modes further include a step division mode with a stepped division boundary.

6. The method of claim 5, wherein the step division mode is determined based on a beginning position of the division of the block or a division direction of the division of the block.

7. The method of claim 5, wherein whether the step division mode is used and an index of a division proportion of the step division mode are included in a codec end, wherein the division proportion of the step division mode includes a division proportion in a vertical direction and a division proportion in a horizontal direction.

8. The method of claim 1, wherein the determining, based on the plurality of division modes of the block, the target division mode of the block includes:
  comparing costs of the plurality of division modes; and
  designating, from the plurality of division modes, a division mode with a smallest cost as the target division mode.

9. A system, comprising:
  at least one storage device storing executable instructions, and
  at least one processor in communication with the at least one storage device, when executing the executable instructions, causing the system to perform operations including:
    obtaining a block to be predicted in an image frame;
    determining a division condition based on at least one of a size of the block or a type of the image frame;
    determining, based on a plurality of division modes of the block, a target division mode of the block, the plurality of division modes including an equal division mode that is configured to divide the block into multiple sub-blocks with a same size;
    dividing, based on the target division mode, the block into a plurality of sub-blocks, includes:
      determining whether the target division mode is suitable for the block based on the division condition; and
      in response to a determination that the target division model is suitable for the block, dividing the block, based on the target division mode, into the plurality of sub-blocks; and
    encoding the block based on the plurality of sub-blocks.

10. The system of claim 9, wherein the plurality of division modes further include at least one derivative division mode based on the equal division mode, the at least one derivative division mode being formed by removing a count of division boundaries used in the equal division mode, the count being greater than or equal to 1 and less than a difference between a count of the multiple of sub-blocks and 1.

11. The system of claim 9, wherein the plurality of division modes further include a combination division mode, the combination division mode including a first division mode and a second division mode, and being configured to divide the block into multiple sub-blocks based on the first division mode and further divide at least one of the multiple sub-blocks based on the second division mode, wherein the first division mode and the second division mode are equal division modes or derivative division modes.

12. The system of claim 11, wherein one of the first division mode and the second division mode is a horizontal division mode that is configured to divide the block in a horizontal direction, the other of the first division mode and the second division mode is a vertical division mode that is configured to divide the block in a vertical direction.

13. The system of claim 9, wherein the plurality of division modes further include a step division mode with a stepped division boundary.

14. The system of claim 13, wherein the step division mode is determined based on a beginning position of the division of the block or a division direction of the division of the block.

15. The system of claim 13, wherein whether the step division mode is used and an index of a division proportion of the step division mode are included in a codec end, wherein the division proportion of the step division mode includes a division proportion in a vertical direction and a division proportion in a horizontal direction.

16. The system of claim 9, wherein the determining, based on the plurality of division modes of the block, the target division mode of the block includes:
  comparing costs of the plurality of division modes; and
  designating, from the plurality of division modes, a division mode with a smallest cost as the target division mode.

17. The system of claim 1, wherein the operations further include:
  encoding the block based on an index of the target division mode.

18. A non-transitory computer readable medium, comprising a set of instructions, wherein when executed by at least one processor, the set of instructions direct the at least one processor to effectuate a method, the method comprising:
  obtaining a block to be predicted in an image frame;
  determining a division condition based on at least one of a size of the block or a type of the image frame;
  determining, based on a plurality of division modes of the block, a target division mode of the block, the plurality of division modes including an equal division mode that is configured to divide the block into multiple sub-blocks with a same size;
  dividing, based on the target division mode, the block into a plurality of sub-blocks, includes:
    determining whether the target division mode is suitable for the block based on the division condition; and
    in response to a determination that the target division model is suitable for the block, dividing the block, based on the target division mode, into the plurality of sub-blocks; and
  encoding the block based on the plurality of sub-blocks.

19. The method of claim 1, wherein a division proportion of a plurality of division mode of the block is determined based on a texture feature of the block.

* * * * *